(12) United States Patent
Weiss

(10) Patent No.: US 11,262,296 B2
(45) Date of Patent: Mar. 1, 2022

(54) CONNECTING DEVICE FOR CONNECTING A GAS SENSOR

(71) Applicant: INFICON GmbH, Cologne (DE)

(72) Inventor: Sebastian Weiss, Cologne (DE)

(73) Assignee: INFICON GmbH, Cologne (DE)

( * ) Notice: Subject to any disclaimer, the term of this patent is extended or adjusted under 35 U.S.C. 154(b) by 0 days.

(21) Appl. No.: 16/972,076

(22) PCT Filed: Jun. 4, 2019

(86) PCT No.: PCT/EP2019/064537
§ 371 (c)(1),
(2) Date: Dec. 4, 2020

(87) PCT Pub. No.: WO2019/234051
PCT Pub. Date: Dec. 12, 2019

(65) Prior Publication Data
US 2021/0231561 A1    Jul. 29, 2021

(30) Foreign Application Priority Data
Jun. 5, 2018 (DE) .................... 10 2018 208 826.8

(51) Int. Cl.
*G01N 21/00* (2006.01)
*G01N 21/3504* (2014.01)
*G01M 3/38* (2006.01)
*G01M 3/00* (2006.01)

(52) U.S. Cl.
CPC .......... *G01N 21/3504* (2013.01); *G01M 3/38* (2013.01); *G01M 3/007* (2013.01); *G01N 2201/0221* (2013.01)

(58) Field of Classification Search
CPC .. G01N 21/39; G01N 21/3504; G01N 21/031; G01N 2021/399; G01J 3/42
USPC .......................................................... 356/437
See application file for complete search history.

(56) References Cited

U.S. PATENT DOCUMENTS

| 2004/0051043 A1 | 3/2004 | Kilian et al. |
| 2006/0102844 A1 | 5/2006 | Sauer et al. |
| 2008/0277586 A1 | 11/2008 | Cardinale |

(Continued)

FOREIGN PATENT DOCUMENTS

| DE | 102008050901 A1 | 6/2010 |
| DE | 202016103360 U1 | 9/2017 |

*Primary Examiner* — Md M Rahman
(74) *Attorney, Agent, or Firm* — The Webb Law Firm

(57) ABSTRACT

Disclosed is a connecting device for connecting a gas sensor to a gas leak detector. The gas sensor includes an elongate sensor housing. The gas leak detector includes at least one gas connector adapted to be connected to the gas sensor. A guide rail connects to the gas leak detector, engaging with the sensor housing such that the gas connectors engage with at least one complementary second gas connector. A fastening claw includes two elastic spring legs arranged at one of the sensor housing and the gas leak detector. Each of the two spring legs includes a latching boss engaging the frontal end of the gas sensor opposite the second gas connector and a spreading element having two retaining arms. Each retaining arm includes a pulling edge, an inclined insertion portion along which the latching boss grips and pivots the spring leg, and an inclined disengagement portion.

6 Claims, 5 Drawing Sheets

(56) References Cited

U.S. PATENT DOCUMENTS

2018/0185606 A1\* 7/2018 Van Schalkwyk ............................ A61M 16/0069

\* cited by examiner

CONNECTING DEVICE FOR CONNECTING A GAS SENSOR

CROSS-REFERENCE TO RELATED APPLICATIONS

This application is the United States national phase of International Application No. PCT/EP2019/064537 filed Jun. 4, 2019, and claims priority to German Patent Application No. 10 2018 208 826.8 filed Jun. 5, 2018, the disclosures of which are hereby incorporated by reference in their entirety.

BACKGROUND OF THE INVENTION

Field of the Invention

The disclosure relates to a connecting device for connecting a gas sensor to a gas leak detector.

Description of Related Art

Gas sensors serve for analyzing gas supplied to the sensor and operate according to the principle of infrared absorption spectrometry, for example. Typically, gas sensors are provided with an elongate cuvette in which the gas to be analyzed is irradiated by IR radiation. For protecting the measuring components of the gas sensor, the latter is provided with an elongate sensor housing which comprises two opposite frontal ends. Gas sensors are necessary components of a gas leak detector for detecting a gas leak.

It is an object of the disclosure to provide a gas sensor which is adapted to be reliably, fixedly and removably connected to a gas leak detector.

The connecting device is defined by this disclosure.

SUMMARY OF THE INVENTION

A guide rail is provided which is arranged at one of the gas sensor and the gas leak detector, that is either at the gas sensor or at the gas leak detector. The guide rail engages with the other one of the gas sensor and the gas leak detector such that the gas sensor is adapted to be displaced in the longitudinal direction along the guide rail. In the distal end position of the gas sensor, when being displaced along the guide rail, at least a first gas connector of the gas leak detector engages with a corresponding complementary second gas connector of the gas sensor in a gas-conducting manner. In this position, the sensor housing is retained at the gas leak detector with the aid of a fastening claw which is fixedly fastened to one of the gas sensor and the gas detector and comprises two elastic spring legs. Each spring leg comprises a latching boss which engages with a frontal end of the guide rail.

A spreading element having two retaining arms is configured to be pushed between the fastening claw and the frontal end of the sensor housing. In doing so, each of the two retaining arms grips between a spring leg and the sensor housing and expands the spring leg such that the latching boss is disengaged from the sensor housing. Each retaining arm is provided with a pulling edge which grips behind the frontal end of the sensor housing and, when the spreading element is pulled in the proximal direction, retains the sensor housing and displaces it also in the proximal direction. Each retaining arm is provided with an inclined insertion portion which, when the spreading element is displaced in the distal direction, contacts the latching boss and presses it outward such that the spring leg is bent.

An inclined disengagement portion can be provided for engaging, in the distal end position of the spreading element when the latter grips around the frontal end of the sensor housing, with the latching boss of the fastening claw such that a pulling resistance must be overcome when the sensor housing is pulled in the proximal direction. This pulling resistance results from the spring force of the spring legs and the inclination of the inclined disengagement portion relative to the longitudinal direction of the elongate sensor housing.

Each inclined insertion portion and each inclined disengagement portion can be arranged on an outside of the retaining arm, while the pulling edge is arranged on the opposite inside of the retaining arm.

Preferably, the spreading element is configured to be fastened to the frontal end of the sensor housing opposite the second gas connector. For this purpose, a flexible columnar area projecting from the retaining arms can be provided at whose opposite end a T-piece with fastening elements in the form of screw holes, for example, is arranged for the sensor housing.

The spreading element is preferably provided with a pull handle which is configured to be gripped and held by a user for moving the spreading element in the proximal direction, thereby overcoming the pulling resistance produced by the engagement between the inclined disengagement portion and the latching boss, and removing the sensor housing from the gas leak detector.

The fastening claw retains the sensor housing in the inserted condition in its distal end position in which the first and second gas connectors engage with each other in a gas-conducting manner. For disengagement from the latching boss, the spreading element is pushed onto the proximal frontal end of the sensor housing thus bending apart the two spring legs, whereby the latching boss is disengaged from the frontal end of the sensor housing. Instead, the pulling edges at the retaining arms of the spreading element engage with the frontal end of the sensor housing, while the latching bosses slide across the inclined insertion and disengagement portions of the retaining arms. The fastening claw thus grips around the spreading element which, in turn, grips around the frontal end of the sensor housing.

Preferably, the guide rail supports the first gas connector.

BRIEF DESCRIPTION OF THE DRAWINGS

Hereunder an exemplary embodiment of the disclosure will be explained in detail with reference to the Figures in which.

DESCRIPTION OF THE INVENTION

The gas sensor 12 comprises an elongate sensor housing 14. The sensor housing 14 has a first frontal end 16 and a second frontal end 18 opposite the first frontal end 16.

Figure 1:
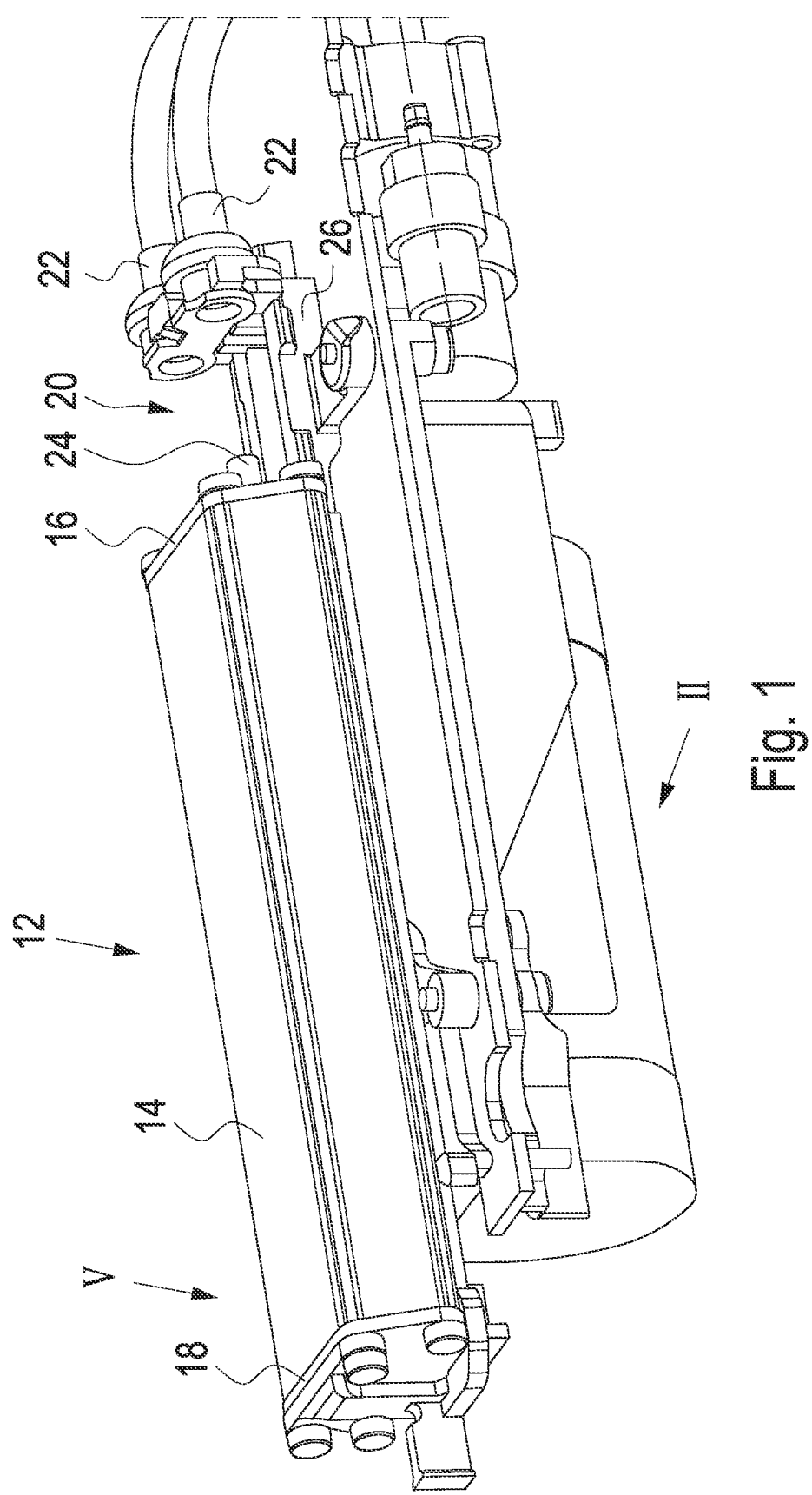
FIG. 1 shows the sensor housing and the gas leak detector.

The gas leak detector 20 merely indicated in FIG. 1 includes two first gas connectors 22 which are each connected to the intake opening of the gas leak detector 20 via elastic tubes. The first gas connectors 22 are configured for engaging with complementary second gas connectors 24 at the first frontal end 16 of the sensor housing 14.

The gas connectors 22 are supported by a guide rail 26 which is fastened to the gas leak detector 20. The guide rail 26 engages with a complementary rail element on the lower side of the sensor housing 14 according to the groove-and-tongue principle, for example. The guide rail 26 is configured for displacing the sensor housing 14 in the longitudinal direction along the longitudinal axis of the sensor housing 14. When the sensor housing 14 is displaced in the distal longitudinal direction, the gas connectors 22, 24 engage with each other in the distal end position of the sensor housing 14.

Figure 2:
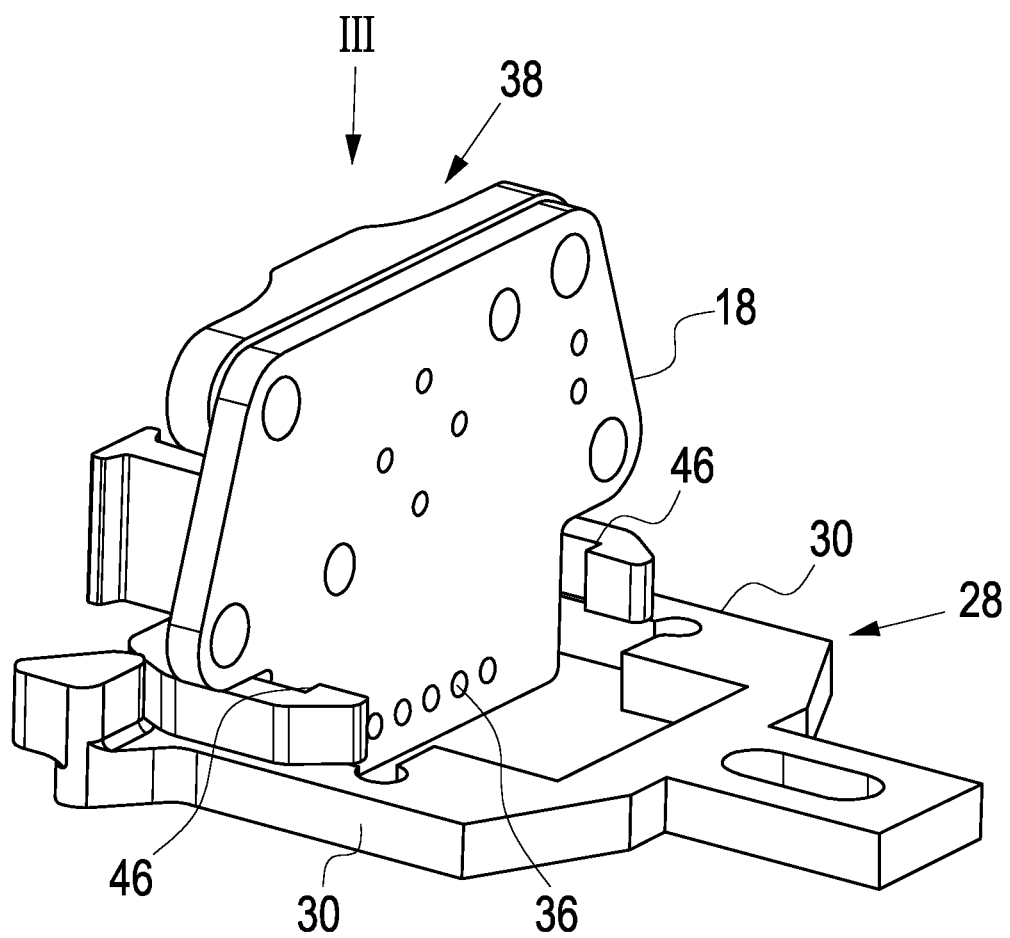
FIG. 2 shows a detail in accordance with II in FIG. 1.
Figure 3:
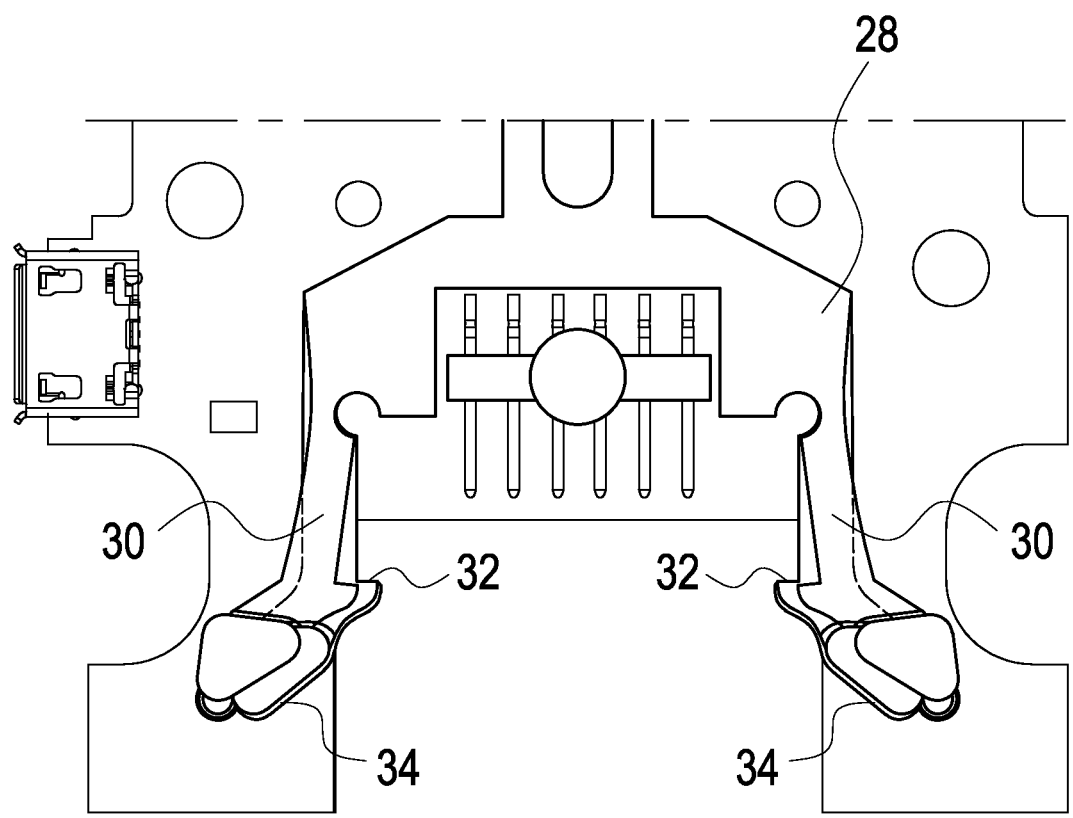
FIG. 3 shows a detail in accordance with III in FIG. 2.

For preventing the gas connectors 22, 24 from disengaging from each other, a fastening claw 28, shown in FIGS. 2-3, is fastened to the gas leak detector 20, said fastening claw comprising two spring legs 30 which are adapted to be elastically pivoted with respect to each other. Each spring leg 30 is provided with a latching boss 32 on its inside, said latching boss gripping behind a portion of the second frontal end 18 and retaining the latter. When the sensor housing 14 is displaced in the distal direction along the guide rail 26, first the second frontal end 18 of the sensor housing 14 slides across sliding surfaces 34 arranged in an inclined manner with respect to the longitudinal axis, whereby the spring legs 30 are bent outward against the force action of the spring force. Once the sensor housing 14 reaches its distal end position, the spring force drives the spring legs 30 back into their initial position in which the latching boss 32 grips behind a lower portion 36 of the second frontal end 18 and retains the latter.

Figure 4:
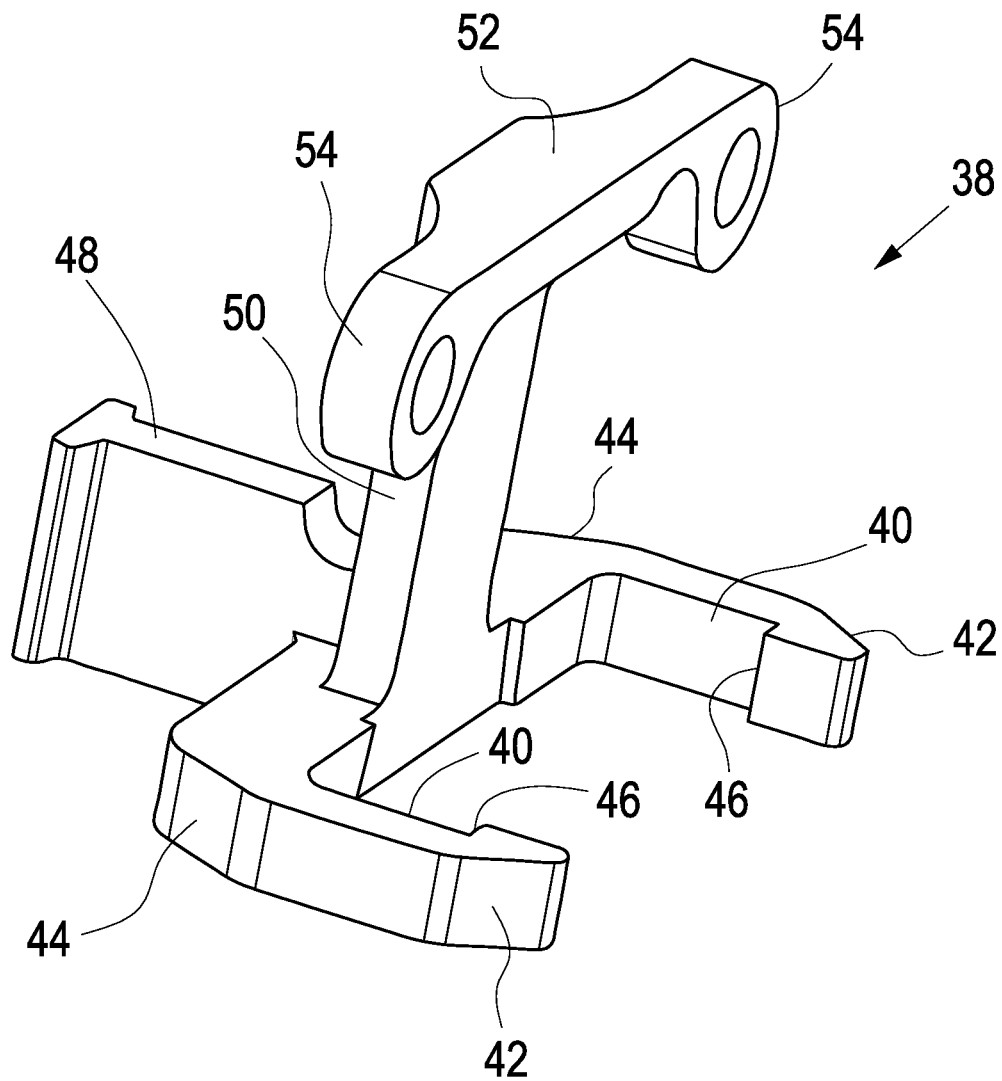
FIG. 4 shows a perspective view of the spreading element.

For disconnecting the connection between the fastening claw 28 and the sensor housing 14, a spreading element 38, shown in FIG. 4, is pushed onto the second frontal end 18 of the sensor housing 14. For this purpose, the spreading element 38 comprises two retaining arms 40 including on their outside a respective distal inclined insertion portion 42 and a proximal inclined disengagement portion 44. When the spreading element 38 is advanced in the distal direction, each inclined insertion portion 42 presses against the latching boss 32 and presses the corresponding spring leg 30 outward, whereby the latching boss 32 is disengaged from the second frontal end 18 of the sensor housing 14. Instead, the two retaining arms 40 grip around the lower portion 36 of the frontal end 18, wherein a pulling edge 46 is provided on the inside of each retaining arm 40, said pulling edge engaging the lower portion 36 and gripping behind the latter.

The spreading element 38 is provided with a pull handle 48 which projects from the spreading element 38 in the proximal direction and is configured for being gripped and held.

Further, the spreading element 38 is provided with an upright T-piece made up of a flexible center column 50 and an upper crossbar 52 and at whose outer ends the fastening elements 54 having screw holes for screwing to the second frontal end 18 of the sensor housing 14 are provided.

Figure 5:
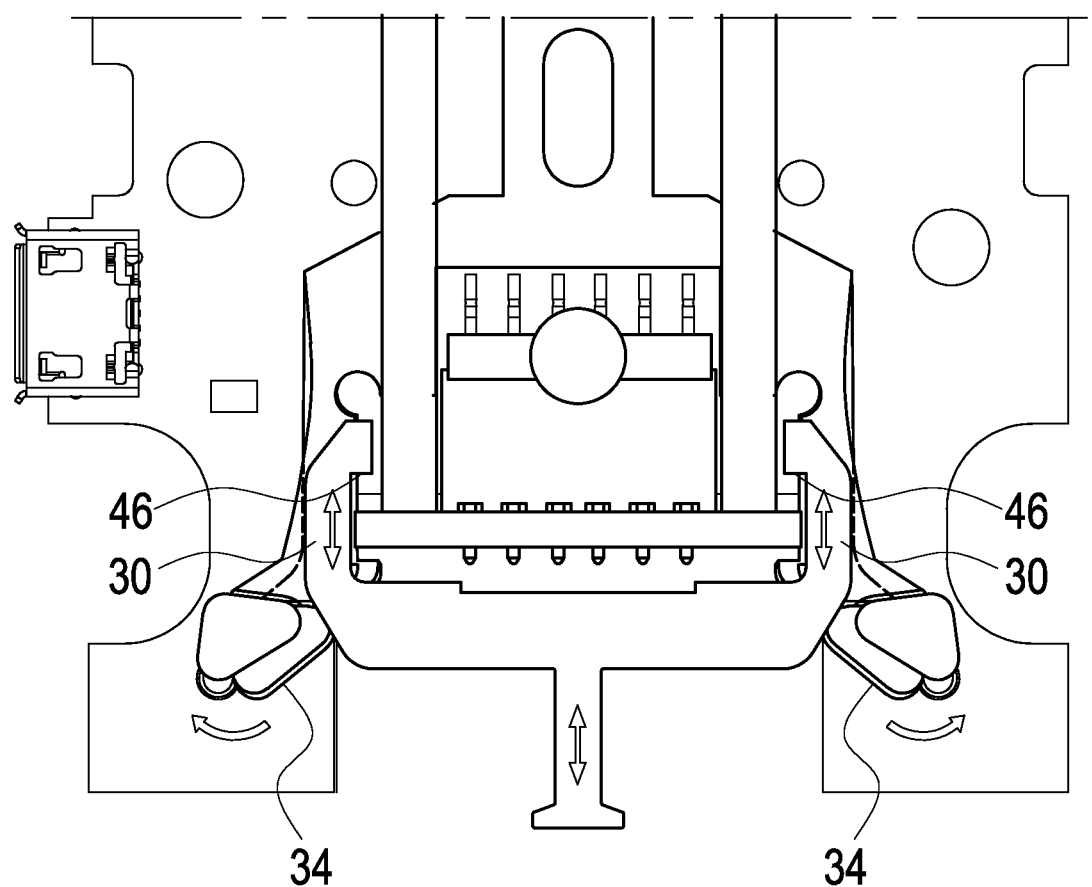
FIG. 5 shows a detail in accordance with V in FIG. 1.

When the spreading element 38 is pulled in the proximal direction via the pull handle 48 while the pulling edges 46 grip behind the frontal end 18, each one of the two latching bosses 32 slides along the inclined disengagement portion 44 and is pressed outward, whereby the respective spring leg 30 springs back and disengages the spreading element 38 from the fastening claw 28, as shown in FIG. 5.

The combination of guide rail, fastening claw 28 and spreading element 38 according to the disclosure allows for creating a stable connection between a gas sensor 12 and a gas leak detector 20 protected against inadvertent disconnection and adapted to be easily disconnected, if required.

The connection does not exert any appreciable mechanical forces upon the two gas connectors 22, 24 and does not affect their engagement with each other such that an adverse effect on the gas transmission and the signal transmission between the gas sensor 12 and the gas leak detector 20 is avoided.

The invention claimed is:

1. A connecting device for connecting a gas sensor to a gas leak detector, wherein the gas sensor comprises an elongate sensor housing comprising two opposite frontal ends and the gas leak detector comprises at least one gas connector adapted to be connected to the gas sensor,
wherein
a guide rail connected to the gas leak detector, said guide rail engaging with the sensor housing such that, in an end position of the gas sensor, the at least one gas connector engage with at least one complementary second gas connector of the gas sensor in a gas-conducting manner,
a fastening claw comprising two elastic spring legs extending in parallel to each other and arranged at one of the sensor housing and the gas leak detector, wherein each one of the two spring legs comprises a latching boss engaging a frontal end of the gas sensor opposite the second gas connector for retaining it in its distal end position and preventing a displacement in a proximal direction, and
a spreading element comprising two retaining arms configured for gripping around the frontal end of the sensor housing,
wherein each retaining arm comprises a pulling edge for gripping behind the frontal end, and wherein each retaining arm comprises an inclined insertion portion along which the latching boss of a spring leg grips and pivots the spring leg against a spring force when the spreading element is displaced in a distal direction, and
wherein each retaining arm comprises an inclined disengagement portion where in the distal end position of the sensor housing, when the pulling edges engage with the frontal end of the sensor housing, the latching bosses engage the inclined disengagement portions and increase a mechanical resistance which is to be overcome for displacing the sensor housing and the spreading element in the proximal direction along the guide rail.

2. The connecting device according to claim 1, wherein each one of the two retaining arms comprises the pulling edge on its inside and the inclined insertion portion and the inclined disengagement portion on its opposite outside.

3. The connecting device according to claim 1, wherein the spreading element is configured for fastening to the frontal end of the sensor housing.

4. The connecting device according to claim 1, wherein the spreading element is provided with a pulling handle which is configured for fixedly gripping the spreading element and to move it in the proximal direction against the resistance produced by the engagement of the inclined disengagement portion with the latching boss.

5. The connecting device according to claim 1, wherein the spreading element and the fastening claw are configured such that the fastening claw grips around and retains the spreading element when the fastening claw grips around and retains the frontal end of the sensor housing.

6. The connecting device according to claim 1, wherein the guide rail supports the at least one gas connector of the gas leak detector.

\* \* \* \* \*